United States Patent
Jin (10) Patent No.: US 9,387,804 B2
(45) Date of Patent: Jul. 12, 2016

(54) IMAGE DISTORTION COMPENSATING APPARATUS AND OPERATING METHOD THEREOF

(71) Applicant: HYUNDAI MOBIS Co., Ltd., Yongin-si, Gyeonggi-do (KR)

(72) Inventor: Soon Jong Jin, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/518,017

(22) Filed: Oct. 20, 2014

(65) Prior Publication Data

US 2015/0193916 A1   Jul. 9, 2015

(30) Foreign Application Priority Data

Jan. 3, 2014 (KR) ................ 10-2014-0000602

(51) Int. Cl.
| | | |
|---|---|---|
| G09G 5/00 | (2006.01) | |
| B60R 1/00 | (2006.01) | |
| G06T 11/60 | (2006.01) | |
| G06T 7/00 | (2006.01) | |
| G06T 3/40 | (2006.01) | |

(52) U.S. Cl.
CPC ............ B60R 1/00 (2013.01); G06T 3/4038 (2013.01); G06T 7/0042 (2013.01); G06T 7/0085 (2013.01); G06T 11/60 (2013.01); B60R 2300/105 (2013.01); B60R 2300/303 (2013.01); G06T 2207/30264 (2013.01)

(58) Field of Classification Search
CPC .......... G09G 5/14; G06T 5/006; G06T 11/60; G06T 7/0085; G06T 2207/10004; G06T 2207/20192; B60R 1/00
USPC ......... 345/619, 629, 634, 635, 636, 650, 653, 345/654
See application file for complete search history.

(56) References Cited

U.S. PATENT DOCUMENTS

| | | | | |
|---|---|---|---|---|
| 5,629,989 | A * | 5/1997 | Osada ................. | G06K 9/4633 382/168 |
| 7,307,655 | B1 * | 12/2007 | Okamoto ........... | G06K 9/00791 348/222.1 |
| 2007/0031004 | A1 * | 2/2007 | Matsui ................. | G06T 7/0034 382/103 |
| 2008/0140286 | A1 * | 6/2008 | Jung ................. | B62D 15/0285 701/41 |
| 2009/0282365 | A1 * | 11/2009 | Ogawa ................ | H04N 1/2112 715/808 |
| 2011/0216194 | A1 * | 9/2011 | Kosaki ..................... | H04N 7/18 348/148 |
| 2011/0285848 | A1 * | 11/2011 | Han ........................ | B60R 1/00 348/148 |
| 2011/0285856 | A1 | 11/2011 | Chung | |
| 2012/0098933 | A1 * | 4/2012 | Robinson ........... | H04N 13/0018 348/46 |

(Continued)

OTHER PUBLICATIONS

Jan. 14, 2016, German Office Action for related DE application No. 102014116199.8.

(Continued)

*Primary Examiner* — Xiao Wu
*Assistant Examiner* — Sarah Lhymn
(74) *Attorney, Agent, or Firm* — Paratus Law Group, PLLC (57) ABSTRACT

Disclosed is an image distortion compensating apparatus and an operating method thereof. The image distortion compensating apparatus includes an image composing unit, an edge detecting unit, a first straight line calculating unit, an intersection point calculating unit, a parking space generating unit, a parking space setting unit, and a second straight line calculating unit. The apparatus removes or deduces inconsistency that occurs at a boundary between images for channels in an AVM system.

12 Claims, 8 Drawing Sheets

(56) References Cited

U.S. PATENT DOCUMENTS

2013/0010119 A1* 1/2013 Mitsugi ............... B60R 1/00
348/148
2013/0287303 A1* 10/2013 Tao ..................... G06T 5/003
382/199

OTHER PUBLICATIONS

Sung, Kapje, et al.: Development of image synthesis algorithm with multi-camera. In: Vehicular Technology Conference (VTC Spring), 2012 IEEE 75$^{th}$. IEEE, 2012. S. 1-5.

* cited by examiner

IMAGE DISTORTION COMPENSATING APPARATUS AND OPERATING METHOD THEREOF

CROSS-REFERENCE TO RELATED APPLICATIONS

The present application claims priority to Korean Patent Application Number 10-2014-0000602 filed Jan. 3, 2014, the entire contents of which application is incorporated herein for all purposes by this reference.

TECHNICAL FIELD

The present invention relates to an image distortion compensating apparatus and a method thereof, and more particularly, to an image distortion compensating apparatus which removes or reduces inconsistency which occurs at a boundary between images for channels in an around view monitor (AVM) system which is applied to a vehicle and a method thereof.

BACKGROUND ART

The AVM system captures the surrounding environment through cameras which are provided at a front side, a rear side, a left side, and a right side of the vehicle, composes the captured images, and compensates for an overlapping area to be naturally displayed to display the surrounding environment of the vehicle on a screen in a bird's eye view manner. Therefore, a driver may accurately recognize surrounding circumstances of the vehicle while viewing the displayed surrounding environment and conveniently park without depending on an image which is reflected on a side mirror or a rear view mirror.

In such an AVM system, a mounting position of the camera in the vehicle and a directivity of the camera are designated to capture an image and a specification of the camera is designed in advance so that errors between four cameras which are mounted at front, rear, left, and right sides of the vehicle may be compensated by a tolerance compensating program in a product line.

A main purpose of the tolerance compensation is to minimize an installation tolerance error of a camera. A positional relationship between cameras may be changed due to deterioration of a vehicle, a weight change of the vehicle caused by the number of passengers, a change of tire pressures, or an impact by an accident. Therefore, as illustrated in FIG. 1, an inconsistent area may be generated at a boundary between images generated by the cameras or an inconsistent area with an actual ground may be generated in an entire AVM monitor image.

A typical image which is output through the AVM system has a virtual point of view which is viewed from the top of the vehicle so that a straight parking line corresponding to a parking space needs to have an exact straight line shape not only in an image for one channel, but also in a composite image for all channels.

Figure 1:
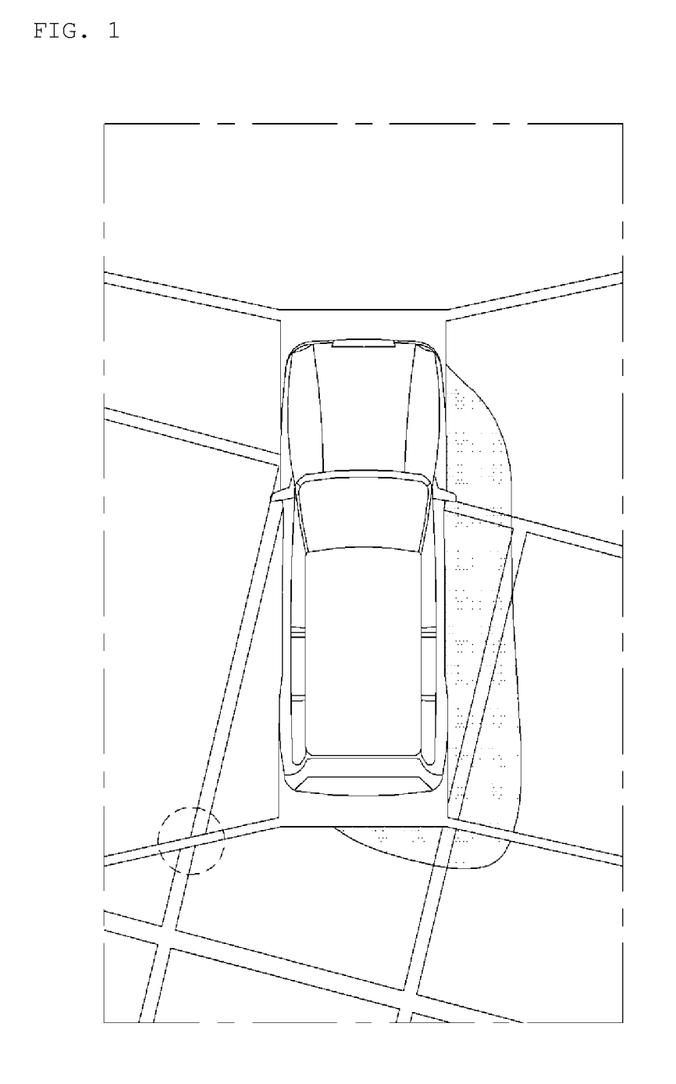
FIG. 1 is an exemplary diagram illustrating an inconsistency of a boundary between images for channels which may be caused in an AVM system.

However, it can be seen that a disconnected portion (a circle represented with a dotted line) is found at a part of a left parking line of the vehicle in FIG. 1. Further, the parking space configured by parking lines needs to have a shape exactly complying with a standard (for example, a rectangle) of the parking space. In this case, when parking lines coexist at a boundary between images generated by the cameras, extending lines of the parking lines need to exactly meet at one point and a difference of the portions between channels which do not match may be determined as a tolerance.

The inconsistency of the boundaries between channels deteriorates a subjective image quality for a driver viewing the image and cannot provide exact information on surroundings of the vehicle to the driver so that a driver assistance function which is considered as an essence of the AVM system may be unhelpful.

In order to solve the above-mentioned problems, there is a method that manually compensates for the tolerance using a tolerance compensating line which is provided in a product line or an A/S center, but the method has a limitation that requires a separate time and effort of a driver and requires excessive cost.

SUMMARY OF THE INVENTION

The present invention has been made in an effort to provide an image distortion compensating apparatus which removes or reduces inconsistency that occurs at a boundary between images for channels in an AVM system and a method thereof.

Objects of the present invention are not limited to the above-mentioned objects, and other objects, which are not mentioned above, can be clearly understood by those skilled in the art from the following descriptions.

Another aspect of the present invention provides, an image distortion compensating apparatus, including: an image composing unit which composes original images generated by a plurality of cameras to generate an around view type composite image; an edge detecting unit which detects an edge of the composite image to generate an edge image; a first straight line calculating unit which calculates a first equation which is an equation of straight lines for a plurality of edges included in the edge image; an intersection point calculating unit which calculates an intersection point between straight lines corresponding to the first equation; a parking space generating unit which generates a virtual parking space with the intersection points as apexes; a parking space setting unit which sets the virtual parking space as a target parking space; and a second straight line calculating unit which calculates a second equation which is an equation of straight lines for four corners of the target parking space.

Another aspect of the present invention provides, an operating method of an image distortion compensating apparatus, including: composing original images generated by a plurality of cameras to generate an around view type composite image; detecting an edge of the composite image to generate an edge image; calculating a first equation which is an equation of straight lines for a plurality of edges included in the edge image; calculating an intersection point between straight lines corresponding to the first equation; generating a virtual parking space with the intersection points as apexes; setting the virtual parking space as a target parking space; and calculating a second equation which is an equation of straight lines for four corners of the target parking space.

Other detailed matters of the embodiments are included in the detailed description and the drawings.

According to exemplary embodiments of the present invention, it is possible to provide an image distortion compensating apparatus which removes or reduces inconsistency which occurs at a boundary between images for channels in an AVM system and a method thereof.

Further, the driver does not need to worry about a separate time, effort, and cost, and as a result, convenience for the driver may be improved.

The convenience for the driver is improved by automatically compensating for a tolerance, A/S cost for compensating for a tolerance of the AVM system is reduced, and additional cost is not required by installing the AVM system in the vehicle.

The effects of the present invention are not limited to the aforementioned effects, and other effects, which are not mentioned above, will be apparently understood by a person skilled in the art from the recitations of the claims.

DETAILED DESCRIPTION OF THE INVENTION

Advantages and characteristics of the present invention and a method of achieving the advantages and characteristics will be clear by referring to exemplary embodiments described below in detail together with the accompanying drawings. However, the present invention is not limited to exemplary embodiments disclosed herein but will be implemented in various forms. The exemplary embodiments are provided by way of example only so that a person of ordinary skilled in the art can fully understand the disclosures of the present invention and the scope of the present invention. Therefore, the present invention will be defined only by the scope of the appended claims. Meanwhile, terminologies used in the present specification are to explain exemplary embodiments rather than limiting the present invention.

Unless particularly stated otherwise in the present specification, a singular form also includes a plural form. The meaning of "comprises" and/or "comprising" used in this specification does not exclude the existence or addition of one or more other constituent elements, steps, operations, and/or devices other than aforementioned constituent elements, steps, operations, and/or devices.

Further, terminologies including an ordinal number such as first or second which are used in the present specification may be used to distinguish one component from the other component having the same name but the terminologies do not limit the orders in the description.

Figure 2:
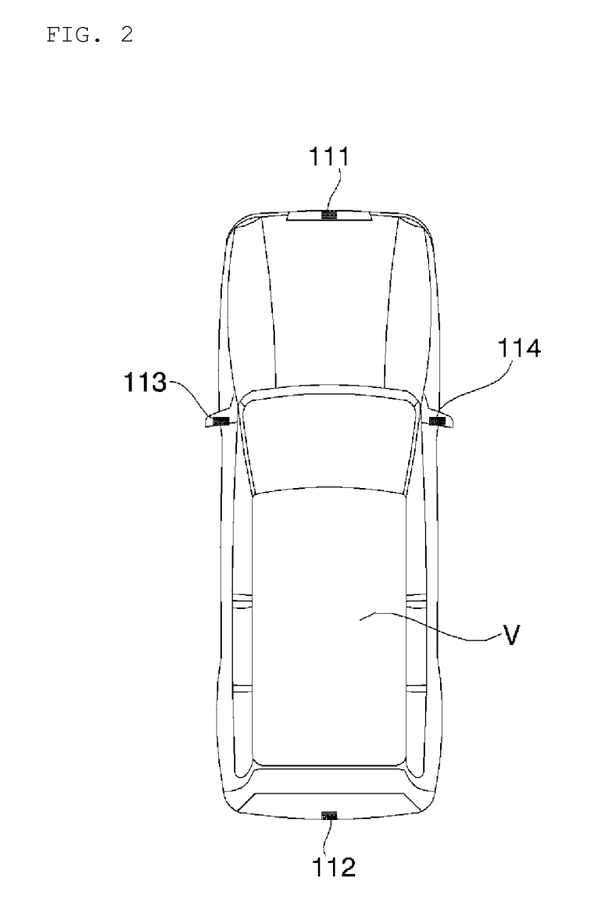
FIG. 2 is an exemplary diagram illustrating that a camera of an AVM system is mounted in a vehicle according to an exemplary embodiment of the present invention.

FIG. 2 is an exemplary diagram illustrating that a camera is mounted in a vehicle according to an exemplary embodiment of the present invention.

Referring to FIG. 2, a plurality of cameras 111, 112, 113, and 114 may be mounted in a vehicle V. Such a plurality of cameras 111, 112, 113, and 114 may be one component of the above-mentioned AVM system. The number of plurality of cameras 111, 112, 113, and 114 may be four in order to obtain images for a front side, a rear side, a left side, and a right side of the vehicle V but more or less cameras may be included depending on an angle of view or a mounting position of the camera.

The plurality of cameras 111, 112, 113, and 114 captures a physical space within a predetermined distance from the vehicle V to generate an image signal.

The first camera 111 is mounted at the front side of the vehicle V to capture a front side image. The first camera 111 may be mounted on a portion of a front bumper. The second camera 112 is mounted at the rear side of the vehicle V to capture a rear side image. The second camera 112 may be mounted on a portion of a rear bumper, that is, an upper side or a lower side of a license plate. The third camera 113 is mounted at the left side of the vehicle V to capture surrounding images at a left side. The third camera 113 may be mounted on a portion of a left side mirror of the vehicle V or a portion of a front fender. The fourth camera 114 is mounted at the right side of the vehicle V to input surrounding images as a right side. The fourth camera 114 may be mounted on a portion of a right side mirror of the vehicle V or a portion of a front fender.

When images captured by adjacent cameras (for example, the first camera and the second camera) are composed, there may be boundaries at which images for channels meet. Therefore, one coordinate system which becomes a criterion of a positional relationship between a plurality of cameras is required in order to match the boundaries, so that a world coordinate system may be used therefor.

Figure 3:
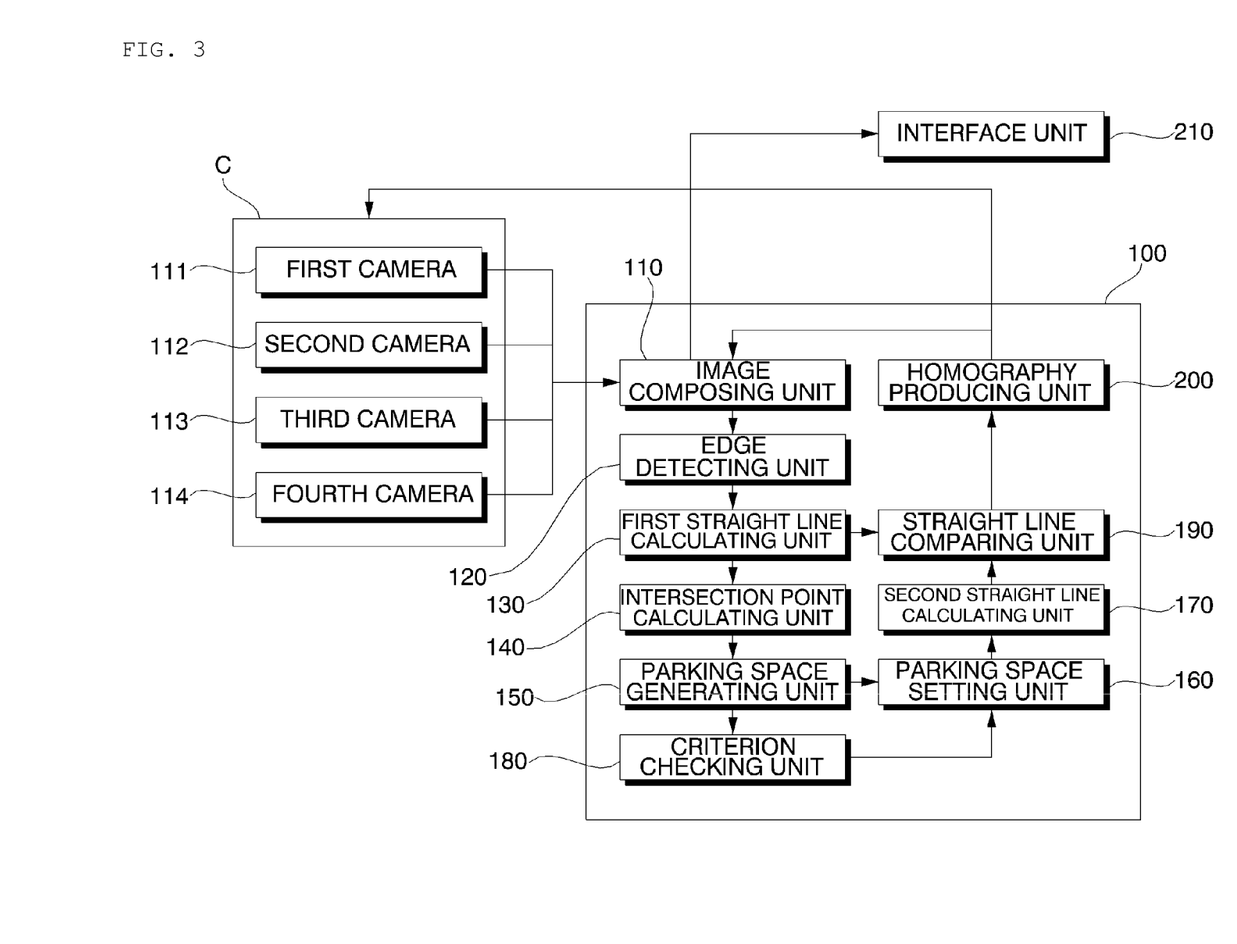
FIG. 3 is a block diagram of an image distortion compensating apparatus according to an exemplary embodiment of the present invention.
Figure 4:
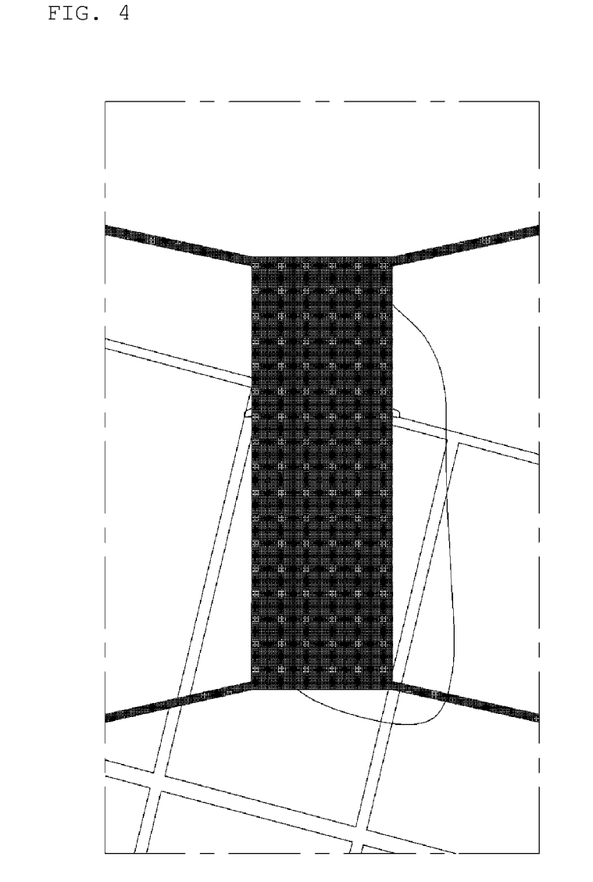
FIG. 4 is an exemplary diagram of an edge image which is generated by detecting an edge of a composite image according to an exemplary embodiment of the present invention.
Figure 5:
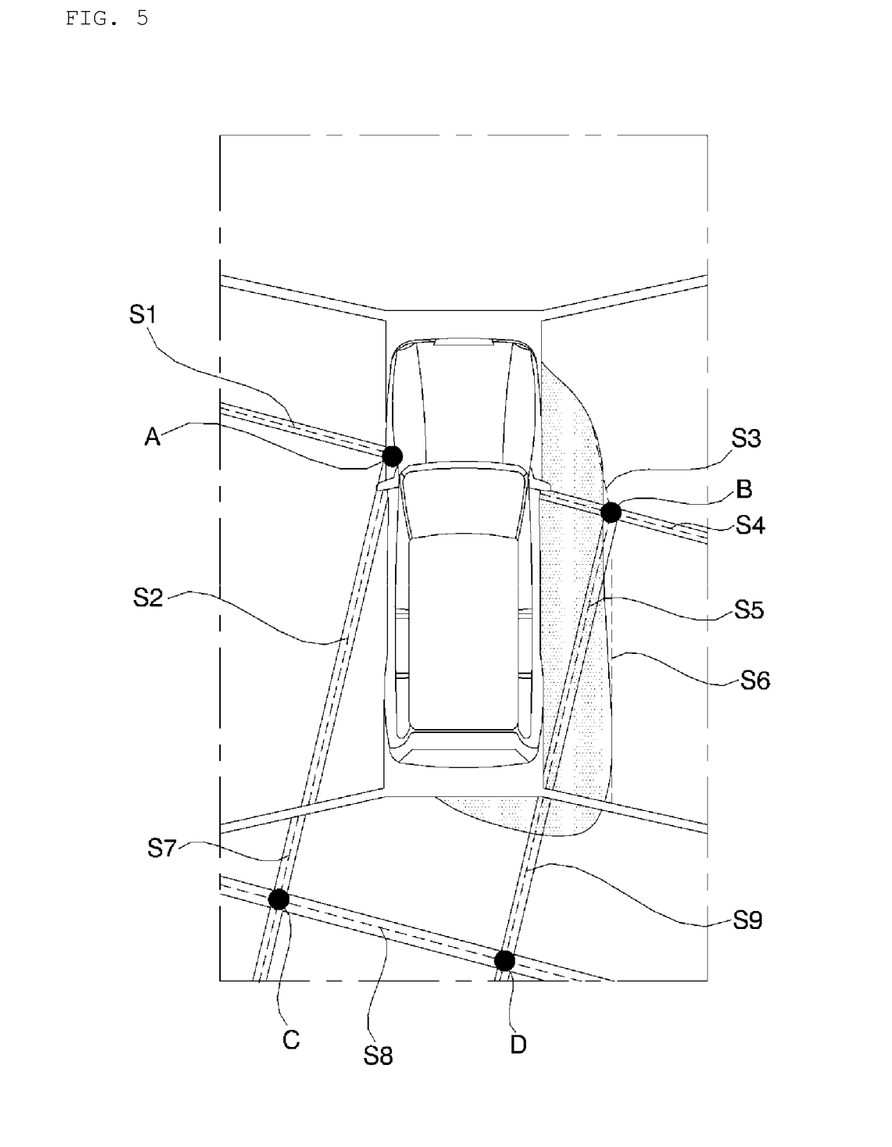
FIG. 5 is an exemplary diagram for calculating an equation of a straight line for an edge according to an exemplary embodiment of the present invention.
Figure 6:
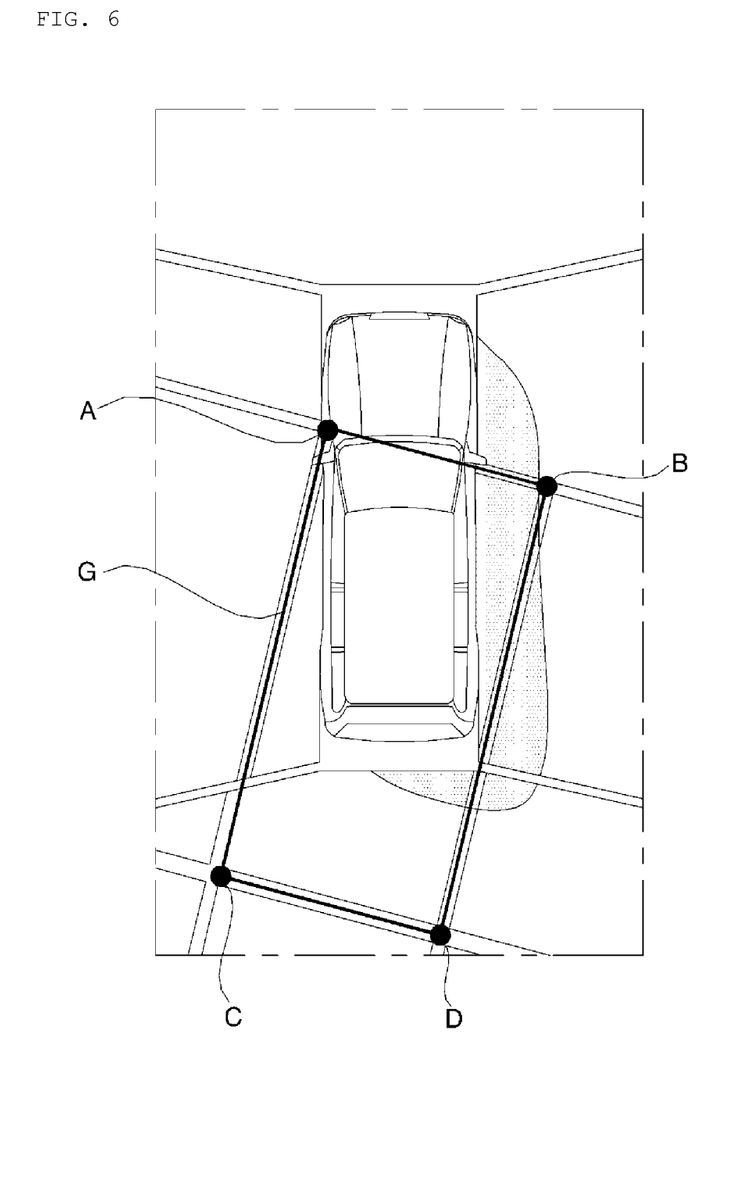
FIG. 6 is an exemplary diagram illustrating a parking space which is virtually generated according to an exemplary embodiment of the present invention.

FIG. 3 is a block diagram of an image distortion compensating apparatus according to an exemplary embodiment of the present invention, FIG. 4 is an exemplary diagram of an edge image which is generated by detecting an edge of a composite image according to an exemplary embodiment of the present invention, FIG. 5 is an exemplary diagram for calculating an equation of a straight line for an edge according to an exemplary embodiment of the present invention, and FIG. 6 is an exemplary diagram illustrating a parking space which is virtually generated according to an exemplary embodiment of the present invention.

First, referring to FIG. 3, the image distortion compensating apparatus according to an exemplary embodiment of the present invention may include a camera unit which includes a plurality of cameras 111, 112, 113, and 114 and a control unit 100. Further, the image distortion compensating apparatus may further include an interface unit 210 if necessary. The plurality of cameras 111, 112, 113, and 114 has been described above with reference to FIG. 2.

The control unit 100 includes an image composing unit 110, an edge detecting unit 120, a first straight line calculating unit 130, an intersection point calculating unit 140, a parking space generating unit 150, a parking space setting unit 160, and a second straight line calculating unit 170. Further, the control unit 100 may further include a criterion checking unit 180, a straight line comparing unit 190, or a homography producing unit 200, if necessary.

The image composing unit 110 composes original images generated by the plurality of cameras 111, 112, 113, and 114 to generate an around view type composite image. Specifically, the image composing unit 110 composes image signals of individual channels which are generated by the plurality of cameras 111, 112, 113, and 114 to generate an around view image which it looks like an area within a predetermined distance from the vehicle is watched from a upper vertical direction of the vehicle.

The edge detecting unit 120 detects an edge of the composite image to generate an edge image. Referring to FIG. 4, an edge image which is obtained by applying an edge detection technique to the composite image illustrated in FIG. 1 may be checked. In this case, the edge detection technique may use at least one of the various known techniques such as a sobel edge technique or a canny edge technique so that detailed description thereof will be omitted.

The first straight line calculating unit 130 calculates a first equation which is an equation of a straight line for a plurality of edges included in the edge image. Here, the first equation is an equation of a straight line which is calculated from the edge image, before generating a virtual parking space which will be described below.

Further, the first straight line calculating unit 130 may detect four or more edges which are capable of being straightened, among edges of the edge image, and calculate the first equation based on gradients and intercepts of the four or more edges. The first straight line calculating unit 130 may determine an edge having a curvature which is equal to or smaller than a predetermined curvature, among the edges of the edge image, an edge capable of being straightened.

When there is an edge (that is, an edge which does not have a straight line shape) having a curvature which is larger than the predetermined curvature, the edge is removed from a first equation calculating target. This is because the edge having a curvature which is larger than the predetermined curvature is highly likely not to be a parking line.

Referring to FIG. 5, it is checked that first to ninth straight lines S1 to S9 for edges except the edge having a curvature which is larger than the predetermined curvature, among the edges of the edge image illustrated in FIG. 4, are detected by the first straight line calculating unit 130. By doing this, the first straight line calculating unit 130 may calculate the first equation based on the gradients and intersects of the first to ninth straight lines S1 to S9.

Further, the first straight line calculating unit 130 may combine a plurality of edges which has the same gradient and intercepts which are within a predetermined error range, among edges which are determined to be able to be straightened, in the edge image by one equation of a straight line. For example, edges for one parking line may be detected at both sides of the parking line so that two edges which are detected from the same parking line are considered as one edge to calculate only one equation of a straight line.

In the meantime, the first straight line calculating unit 130 may detect four or more edges having curvatures which are equal to or smaller than the predetermined curvature, from the edge image. This is because in order to precisely recognize a rectangular parking space, an equation of a straight line for four corners is required.

When the edge image has three or less edges which are capable of being straightened, the first straight line calculating unit 130 may stop calculating the first equation until four or more edges which are capable of being straightened are detected from the edge image. By doing this, an arithmetic amount required to calculate the first equation may be reduced. Hereinafter, the description will be continued on the assumption that the first equation which is an equation of four straight lines has been calculated by the first straight line calculating unit 130.

The intersection point calculating unit 140 calculates an intersection point between straight lines corresponding to the first equation. Referring to FIG. 5, it is confirmed that first to fourth intersection points A, B, C, and D may be calculated by the first equation for the first to ninth straight lines S1 to S9. That is, the first equation for the first to ninth straight lines S1 to S9 has been calculated so that the intersection points may be calculated using the gradient and the intercept of the first equation.

The parking space generating unit 150 generates a virtual parking space with four intersection points (for example, A, B, C, and D of FIG. 5) calculated by the intersection point calculating unit 140 as apexes. A typical parking space is rectangular so that four intersection points are connected to virtually generate a parking space. Referring to FIG. 6, it is confirmed that adjacent intersection points among the four intersection points A, B, C, and D which are calculated in FIG. 5 are connected to generate a virtual rectangular parking space.

The parking space setting unit 160 may set any one of at least one virtual parking space as a target parking space G. Here, the target parking space G refers to a parking space which becomes a target to calculate a second equation which will be described below.

In the meantime, a plurality of virtual parking spaces may be generated from the composite image by the parking space generating unit 150 and some of the virtual parking spaces may be inappropriate for a space where a vehicle is actually parked.

In order to solve the above-mentioned problems, the criterion checking unit 180 may check whether the virtual parking space which is generated by the parking space generating unit 150 complies with a predetermined parking space criterion. For example, the predetermined parking space criteria may include information on an upper limit or a lower limit of a length and a width of the parking space. In this case, the criteria of the length and the width of the parking space may be set to be larger than the length and the width of the vehicle.

When the criterion checking unit 180 determines that the virtual parking space complies with the predetermined criterion, the parking space setting unit 160 may set only the corresponding virtual parking space as the target parking space G.

The second straight line calculating unit 170 calculates a second equation which is an equation of a straight line for four corners of the target parking space G. This is because the target parking space G complies with the above-mentioned criterion so as to be formed by four corners as a rectangle which is a shape of a normal parking space.

The straight line comparing unit 190 determines whether there is an equation of a straight line having a difference from the second equation which is equal to or larger than a predetermined allowable range, in the first equation. That is, the straight line comparing unit 190 compares gradients and intercepts of the equations of straight lines which are included in the first equation and the second equation and determines whether there is a gradient difference or an intercept difference which is equal to or larger than the predetermined allowable range. When there is a gradient difference or an intercept difference which is equal to or larger than the predetermined allowable range, it is required to compensate for an image of a channel in which the difference is generated.

Further, the straight line comparing unit 190 compares the second equation which configures the target parking space G with the first equation to calculate an amount of a difference in accordance with line fitting for every position of pixels which configure the parking lines of the composite image among the images provided from the cameras.

In the meantime, one parking line may extend over areas which are captured by two or more cameras so that an amount of differences in accordance with the line fitting for every channel for first to fourth cameras 111, 112, 113, and 114 may be calculated.

When considering the target parking space G illustrated in FIG. 6, it is assumed that a difference between a seventh straight line S7 illustrated in FIG. 5 and the target parking space G is equal to or larger than a predetermined allowable range. Specifically, the second straight line S2 illustrated in FIG. 5 is calculated from an image of the third camera 113 and the seventh straight line S7 is calculated from an image of the second camera 112 so that a single parking line is captured by different cameras so that it looks like two different disconnected lines (that is, S2 and S7) in the composite image.

As described above, as a criterion of compensating for a composite image which looks different from an actual image, the second equation is used in the present invention, which will be continuously described below.

The homography producing unit 200 receives information on an area where there is a difference between the first equation and the second equation from the straight line comparing unit 190. Therefore, the homography producing unit 200 may produce a homography for correspondence points between the first equation and the second equation in an area where a difference between the first equation and the second equation is equal to or larger than the predetermined allowable range.

Specifically, the homography producing unit 200 may set a point which is to be moved to a straight line according to the second equation, among points of the straight line according to the first equation, as a correspondence point and produce a homography having coordinate transformation information of the correspondence points. The homography may be information including a positional relationship indicating that one point of an arbitrary equation of a straight line of the first equation corresponds to a point of the equation of a straight line of the second equation. That is, when the homography is set, all or some of the straight lines for the first equation may be transformed in a position on the straight line for the second equation.

The homography may have a matrix type and the homography producing unit 200 may configure a homography using pixels of the target parking space G corresponding to pixels of an area corresponding to a parking line of the composite image.

Further, the homography producing unit 200 may produce the homography only when it is determined that the difference which is equal to or larger than a predetermined allowable range is continuously generated a predetermined number of times N or more. This is because when the homography is produced for every frame for the captured image and the composite image is compensated, the arithmetic amount is increased or there may be a limitation in increasing a precision of compensation.

Therefore, the homography producing unit 200 may check whether the number of times it is determined that there is the difference which is equal to or larger than the predetermined allowable range is equal to or larger than the predetermined number N of times. When the continuously accumulated number K of times it is determined that there is a difference is smaller than the predetermined number N of times until now, the homography producing unit 200 only increases the accumulated number K of times by one but may not produce the homography. In the meantime, the first equation and the second equation may be compared for every image frame and in this case, in order to produce the homograph, at least the predetermined number N or more of image frames need to be input from the camera.

In the meantime, even though the homography matrix may be configured by at least four points, the number of pixels of the correspondence points may be much larger than that of the points, so that the homography matrix may be configured for every channel by an optimizing method. For example, an optimized homography matrix may be calculated using a wiener filter.

When the homography producing unit 200 produces a homography, the image composing unit 110 applies the homography to a camera parameter of the camera. In this case, the camera having the camera parameter to which the homography is applied is a camera (for example, the second camera in FIG. 6) of a channel which provides an image having an error which is equal to or larger than the predetermined allowable range and camera parameters of the other cameras may not be changed.

Therefore, the image which is generated by the camera to which the homography is applied is compensated so that a composite image which is closer to the actual image may be finally produced.

Figure 7:
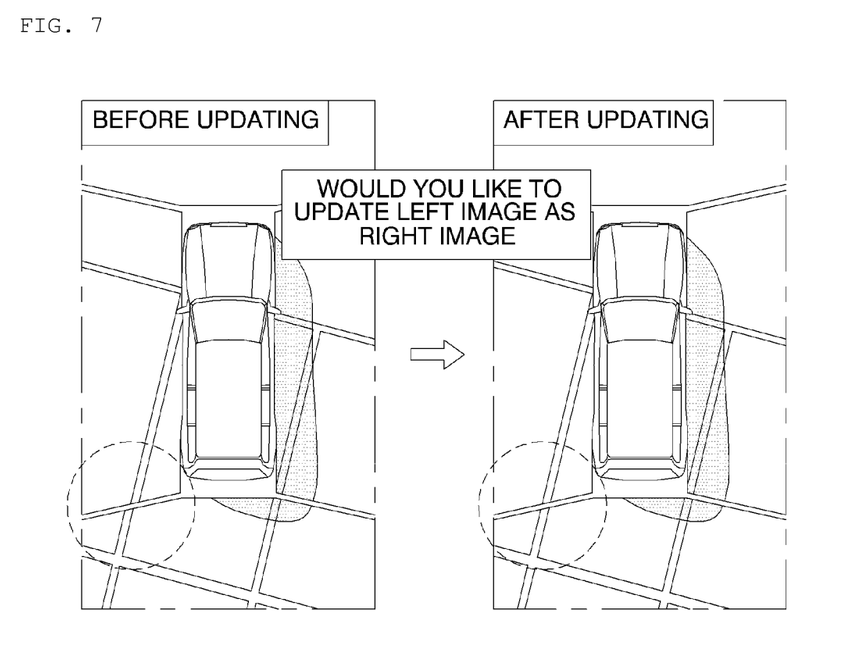
FIG. 7 is an exemplary diagram illustrating a composite image before and after compensating according to an exemplary embodiment of the present invention.

Referring to FIG. 7, the interface unit 210 may display a compensated composite image. In this case, the composite images before and after compensating may be simultaneously displayed. Further, the interface unit 210 may emphasize (for example, add an arrow, highlight, change a color) an area in which the compensation is performed, among a plurality of channels which configures the composite image to display the composite image.

Further, the interface unit 210 may output a message in order to select whether to update the camera parameter using the homography. For example, even though FIG. 7 illustrates that a text message saying "Do you want to update a left side image as a right side image" is displayed in a state when a composite image before being compensated (before being updated) and a composite image after being compensated are simultaneously displayed at a left side and a right side, respectively, the present invention is not limited thereto and any type of message may be output as long as it is recognized by a driver through an illumination module (for example, an LED), a sound module (for example, a speaker), or a vibration module (for example, haptic).

Further, the interface unit 210 may receive an update command from a driver. Since the interface unit 210 receives the update command from the driver, the image composing unit 110 changes a prior camera parameter of the camera which provides an image signal which causes an inconsistency between boundaries of the composite image before being compensated to a camera parameter to which the homography is applied to generate a compensated composite image.

Figure 8:
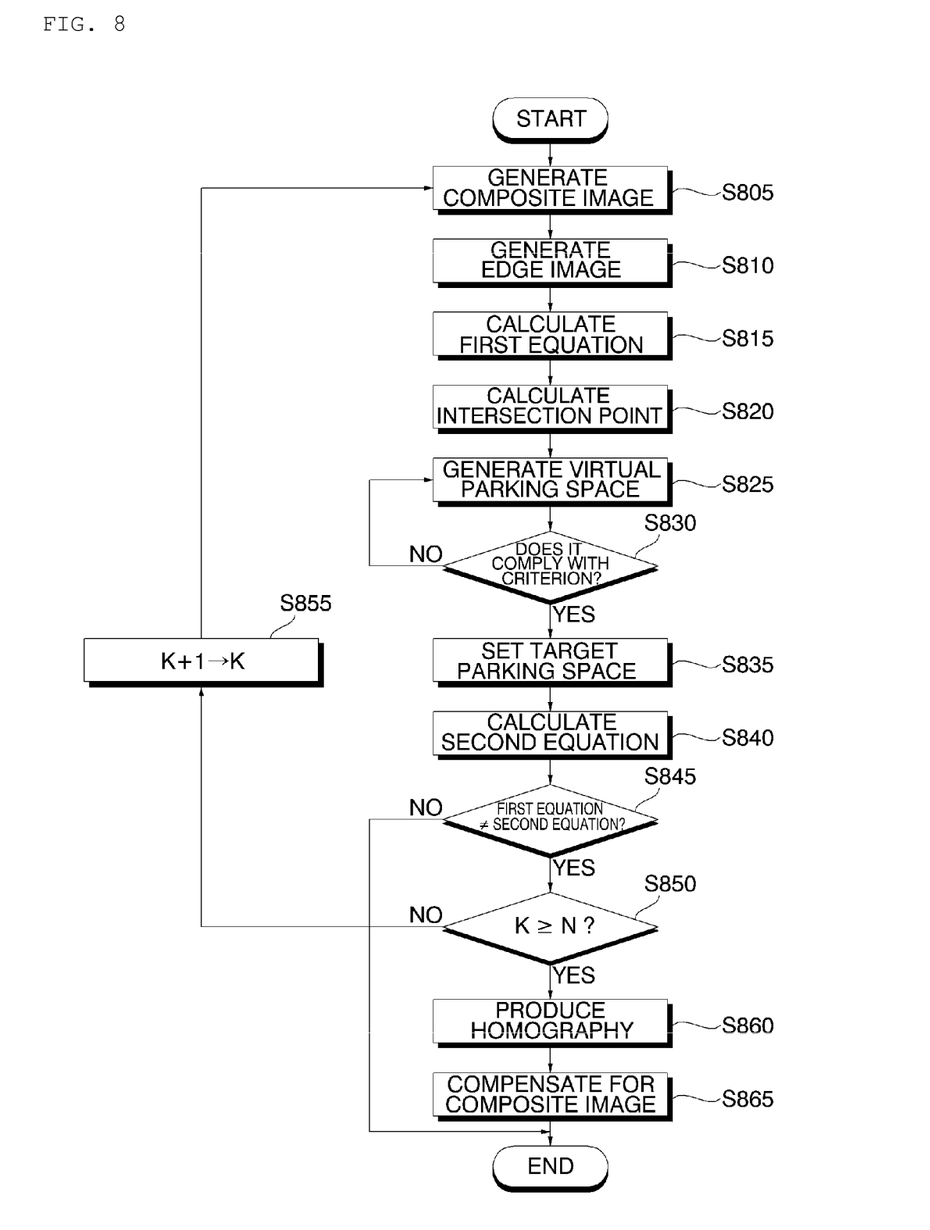
FIG. 8 is a flowchart illustrating an operating method of an image distortion compensating apparatus according to an exemplary embodiment of the present invention.

FIG. 8 is a flowchart illustrating an operating method of an image distortion compensating apparatus 100 according to an exemplary embodiment of the present invention.

Referring to FIG. 8, an image composing unit 110 composes original images generated by a plurality of cameras 111, 112, 113, and 114 to generate an around view type composite image. Specifically, the image composing unit 110 composes image signals of individual channels which are generated by the plurality of cameras 111, 112, 113, and 114 to generate an around view image which looks like an area within a predetermined distance from the vehicle is watched from an upper vertical direction of the vehicle.

Next, an edge detecting unit 120 detects an edge of the composite image to generate an edge image in step S810.

Next, a first straight line calculating unit 130 calculates a first equation which is an equation of a straight line for a plurality of edges included in the edge image in step S815. That is, the first equation refers to two or more equations of a straight line.

Next, an intersection point calculating unit 140 calculates an intersection point of the first equation in step S820. That is, an intersection point between two or more equations of a straight line which are included in the first equation is calculated. For example, intersection points of left and right parking lines and upper and lower parking lines of the parking space may be formed.

Next, a parking space generating unit 150 generates a virtual parking space with intersection points between the equations of a straight line regarding the first equation as apexes in step S825. In this case, a typical parking space is a rectangle so that a condition that four or more intersection points need to be calculated in order to generate a virtual parking space may be designated in advance.

Next, a parking space setting unit 160 sets the virtual parking space as a target parking space G in step S835. In this case, a step S830 of checking, by a criterion checking unit 180, whether the virtual parking space complies with a predetermined parking space criterion may be performed first and only when the virtual parking space complies with the criterion as a result of checking, the above-mentioned step S835 may be performed.

Next, a second straight line calculating unit 170 calculates a second equation which is an equation of a straight line for four corners of the target parking space G in step S840. The second equation may be a criterion of compensating for a channel image which provides at least any one of the equations of a straight line included in the first equation.

Next, a straight line comparing unit 190 may compare whether the first equation and the second equation are equal to each other. Specifically, the straight line comparing unit 190 determines whether there is an equation of a straight line having a difference from the second equation which is equal to or larger than a predetermined allowable range, in the first equation in step S845. This is because only when there is an equation of a straight line having a difference which is equal to or larger than the predetermined allowable range, the composite image needs to be compensated.

In step S845, when it is determined that the first equation has an equation of a straight line having a difference from the second equation which is equal to or larger than the predetermined allowable, a homography producing unit 200 produces a homography for correspondence points between the first equation and the second equation in an area where there is a difference which is equal to or larger than the predetermined allowable range in step S860.

In this case, the homography producing unit 200 may perform a step of determining whether a continuously accumulated number K of times there is a difference is equal to or larger than the predetermined number N of times until now, first in step S850. As a result of determination in step S850, when the accumulated number K of times is smaller than the predetermined number N of times, the homography producing unit 200 performs a step of increasing the accumulated number K of times by one but may not produce the homography in step S855.

Next, an image composing unit 110 applies a homography produced by the homography producing unit 200 to a camera parameter of a camera in which an error is caused in the image to compensate for the composite image in step S855.

In the meantime, the first equation and the second equation may be compared for every image frame and in this case, in order to perform a step of producing the homography, at least the predetermined number N or more of image frames need to be input from the camera.

The exemplary embodiment of the present invention described above is not implemented only by way of an apparatus and a method, but may be implemented by a program which executes a function corresponding to the configuration of the exemplary embodiment of the present invention or a recording medium in which the program is written and those skilled in the art may easily implement the exemplary embodiment from the description of the exemplary embodiment.

Further, in the above described present invention, various substitutions, modifications, and changes can be made within the scope without departing from the spirit of the present invention by those skilled in the art, and as a result, the present invention is not limited to the aforementioned embodiments and the accompanying drawings but may be configured by selectively combining all or some of the exemplary embodiments so as to achieve various modifications.

What is claimed is:

1. An image distortion compensating apparatus, comprising:
   circuitry configured to
      compose original images generated by a plurality of cameras to generate an around view type composite image;
      detect a plurality of edges of the composite image to generate an edge image for each one of the plurality of detected edges;
      calculate a first equation which is an equation of straight lines for each one of the plurality of edges included in the edge image;
      calculate intersection points between straight lines corresponding to the first equation;
      generate a virtual parking space with the calculated intersection points as apexes;
      set the virtual parking space as a target parking space;
      calculate a second equation which is an equation of straight lines connecting four corners of the target parking space;
      determine whether there is an equation of at least one straight line having at least one of a difference of gradients or a difference of intercepts from the second equation with respect to at least one straight line from the first equation, wherein the at least one of the difference of gradients or the difference of intercepts is equal to or larger than a predetermined allowable range for the difference of gradients or the difference of intercepts; and
      produce a homography for correspondence points between the first equation and the second equation in an area of the composite image having the difference of gradients or the difference of intercepts when it is determined that the difference of gradients or the difference of intercepts is continuously present in a predetermined number of consecutively generated composite images,
   wherein the homography is applied to a camera parameter of at least one camera from among the plurality of cameras in order to generate a compensated composite image.

2. The apparatus of claim 1, wherein the the circuitry is further configured to detect four or more edges which are capable of being straightened, among the edges and calculate the first equation based on gradients and intercepts of the four or more edges.

3. The apparatus of claim 1, wherein circuitry is further configured to combine a plurality of edges having the same gradient within a predetermined gradient error range and a difference of intercepts within a predetermined intercept error range in the edge by one equation of a straight line.

4. The apparatus of claim 1, wherein the circuitry is further configured to exclude an edge which is not a straight line, among the edges, from a target for calculating the first equation.

5. The apparatus of claim 1, wherein the circuitry is further configured to generate a rectangular virtual parking space with four intersection points, selected from among the intersection points, as apexes.

6. The apparatus of claim 1, wherein the circuitry is further configured to:
check whether the virtual parking space complies with a predetermined parking space criterion,
wherein when it is determined that the virtual parking space complies with the criterion, the circuitry sets the parking space as a target parking space.

7. The apparatus of claim 1, wherein the circuitry is further configured to:
display the compensated composite image and receive a command whether to update the camera parameter using the homography.

8. The apparatus of claim 7, wherein the circuitry is further configured to simultaneously display composite images before being compensated and after being compensated.

9. An operating method of an image distortion compensating apparatus, implemented via at least one processor, the method comprising:
composing original images generated by a plurality of cameras to generate an around view type composite image;
detecting a plurality of edges of the composite image to generate an edge image for each one of the plurality of detected edges;
calculating a first equation which is equations of straight lines for each one of the plurality of edges included in the edge image;
calculating an intersection point between each connecting set of straight lines corresponding to the first equation;
generating a virtual parking space with the calculated intersection points as apexes;
setting the virtual parking space as a target parking space;
calculating a second equation which is an equation of straight lines connecting four corners of the target parking space;
determining whether there is an equation of at least one straight line having at least one of a difference of gradients or a difference of intercepts from the second equation with respect to at least one straight line from the first equation, wherein the at least one of the difference of gradients or the difference of intercepts is equal to or larger than a predetermined allowable range for the difference of gradients or the difference of intercepts; and
producing a homography for correspondence points between the first equation and the second equation in an area of the composite image having the difference of gradients or the difference of intercepts when it is determined that the difference of gradients or the difference of intercepts is continuously present in a predetermined number of consecutively generated composite images,
wherein the homography is applied to a camera parameter of at least one camera from among the plurality of cameras in order to generate a compensated composite image.

10. The method of claim 9, wherein the calculating of a first equation detects four or more edges which are capable of being straightened, among the plurality of edges and calculates the first equation based on gradients and intercepts of the plurality of edges.

11. The method of claim 9, wherein the generating of a virtual parking space generates a rectangular virtual parking space with four intersection points, among the intersection points, as apexes.

12. The method of claim 9, further comprising:
checking whether the virtual parking space complies with a predetermined parking space criterion.

* * * * *